United States Patent Office 3,057,710
Patented Oct. 9, 1962

3,057,710
CONTROLLING VEGETATION WITH ESTERS OF ALKOXYALKYL DITHIOCARBAMIC ACIDS
Marion W. Harman, Nitro, and John J. D'Amico, Charleston, W. Va., assignors to Monsanto Chemical Company, St. Louis, Mo., a corporation of Delaware
No Drawing. Filed Nov. 9, 1959, Ser. No. 851,529
15 Claims. (Cl. 71—2.7)

The present invention relates to methods of controlling or destroying vegetation and to herbicidal compositions. More particularly, it relates to methods of destroying or controlling vegetation which comprises applying thereto a toxic concentration of a phytotoxic ester of a dithiocarbamic acid.

General objects of the invention are to provide compositions which are toxic to living plants and to provide methods for their use to accomplish various desirable ends. A further general object is to provide compositions and methods for the destruction of noxious vegetation. Another object is to destroy weeds in the form of germinating seedlings. A particular object of the invention is to provide outstanding grass-specific pre-emergence herbicides and methods for using them. Another object is to destroy weeds by applying a toxic concentration of the composition to foliage after emergence. Other and further objects will be apparent from the detailed description which follows.

A method of destroying or controlling undesired vegetation by applying thereto a toxic concentration of a phytotoxic ester of a dithiocarbamic acid was disclosed in copending application Serial No. 470,836, filed November 23, 1954, now U.S. Patent No. 2,919,182, granted December 29, 1959 of which the present application is a continuation-in-part. The phytotoxic esters of the present invention may be represented by the general formula

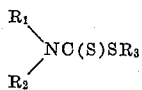

where $R_1$ represents a lower alkoxy substituted lower alkyl group as for example methoxyethyl, ethoxyethyl, propoxyethyl, isopropoxyethyl, butoxyethyl, methoxypropyl, ethoxypropyl, propoxypropyl, methoxybutyl and ethoxybutyl, $R_2$ represents lower alkyl, lower alkenyl or is selected from the same class as $R_1$. $R_3$ represents a lower alkyl, lower alkenyl or halogen substituted lower alkenyl radical. Examples of $R_3$ comprise methyl, ethyl, propyl, isopropyl, butyl, isobutyl, allyl, 2-chloroallyl, 2-bromoallyl, 2-fluoroallyl, 2-iodoallyl, 3-chloroallyl, 3-iodoallyl, 3-chlorobutenyl and methallyl.

The phytotoxic esters of this invention comprise both pre-emergent and post-emergent herbicides. Accordingly, by applying the toxicant to the plant is meant any means whereby the toxicant is brought into contact with living plants which latter include germinating seedlings, as for example by application to the ground before the plants emerge or by direct application to the foliage. Some of the toxicants control prevalent broadleaf weeds, as for example pigweed. The grasses controlled include the three major midwest weedy grasses, crab grass, foxtail and barnyard grass.

The toxicants may be applied conveniently in the form of a spray containing the active ingredient in a concentration within the range of 0.1–10.0% by weight. Thorough coverage of the foliage is effective for contact killing. For pre-emergence control of plants amounts within the range of 1 to 100 pounds per acre may be used. The particular dosage to be applied in a given situation can be readily determined by those skilled in the art by conventional techniques. It depends upon the formulation, type of vegetation to be controlled, climatic conditions and the particular ester used.

The herbicidal compositions applied in carrying out the process of the invention are prepared by admixing the dithiocarbamate with a herbicidal adjuvant as carrier in order to provide formulations adapted for ready and efficient application in liquid or solid form. Solid compositions in the form of dusts or granules are formulated by mixing the toxicant with a finely divided or granular solid, as for example talc, clay, pyrophyllite, silica and fuller's earth. Liquid compositions are prepared by admixing the active ingredient with a conventional liquid diluent media. The active ingredients are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. Emulsifiable concentrates are especially convenient for preparing aqueous sprays for field use. A suitable formulation comprises 45 parts by weight heavy aromatic naphtha, 5 parts by weight emulsifying agent and 50 parts by weight ester toxicant.

The nature of the new ester toxicants will be clear from the following typical examples:

Allyl bis(2-ethoxyethyl)dithiocarbamate
2-chloroallyl bis(2-ethoxyethyl)dithiocarbamate
2-bromoallyl bis(2-ethoxyethyl)dithiocarbamate
Ethyl bis(2-ethoxyethyl)dithiocarbamate
Propyl bis(2-ethoxyethyl)dithiocarbamate
Allyl bis(2-methoxyethyl)dithiocarbamate
2-chloroallyl bis(2-methoxyethyl)dithiocarbamate
2-chloroallyl bis(3-methoxypropyl)dithiocarbamate
2-chloroallyl bis(3-ethoxypropyl)dithiocarbamate
Allyl bis(3-ethoxypropyl)dithiocarbamate
Methallyl bis(2-methoxyethyl)dithiocarbamate
Ethyl bis(2-methoxyethyl)dithiocarbamate
Propyl bis(2-methoxyethyl)dithiocarbamate
Allyl N-propyl N-(2-methoxyethyl)dithiocarbamate
2-chloroallyl N-ethyl N-(2-methoxyethyl)dithiocarbamate
Ethyl N-ethyl-N-(2-methoxyethyl)dithiocarbamate
2-chloroallyl N-allyl N-(2-methoxyethyl)dithiocarbamate
Propyl N-allyl N-(2-methoxyethyl)dithiocarbamate.

As illustrative of pre-emergent herbicidal activity the toxicants are applied as aqueous sprays to a variety of germinating seedlings. The active ingredient is emulsified in water and applied to seeded soil at the rate of 25 pounds per acre. About 14 days after application of the toxicants results are observed and recorded. The number of seeds emerging is converted to weighted herbicidal ratings based on average percent germination of any particular seed lot times an injury factor. This evens irregularities of herbicide ratings of seeds which vary in percent germination. The injury factor takes into consideration any plants not expected to survive. Thus, phytotoxicity ratings are based on the number of plants which emerge and will survive as observed two weeks after planting. Herbicidal ratings are assigned by means of the following conversion scale:

| Percent emergence: | Phytotoxicity rating |
|---|---|
| 0–25 | Severe. |
| 26–50 | Moderate. |
| 51–75 | Slight. |
| 76–100 | None. |

Typical phytotoxicities are recorded below:

Table I

| Toxicant | Phytotoxicity |
| --- | --- |
| Allyl bis(2-methoxyethyl)-dithiocarbamate. | Severe phytotoxicity to wild oats, brome grass, rye grass, red clover, sugar beet and foxtail. |
| 2-Chloroallyl bis(2-methoxyethyl(dithiocarbamate. | Severe phytotoxicity to wild oats, brome grass, rye grass, red clover, cucumber and foxtail; moderate phytotoxicity to mustard radish, sugar beet and cotton. |
| 2-Chloroallyl bis(3-methoxypropyl)dithiocarbamate. | Severe phytotoxicity to red clover and cucumber; moderate phytotoxicity to brome grass and sugar beet. |
| 2-Chloroallyl N-(3-ethoxypropyl)ethyldithiocarbamate. | Severe phytotoxicity to wild oats, rye grass, barnyard grass, crab grass, pigweed, wild buckwheat and sorghum; moderate phytotoxicity to sugar beet. |
| Allyl N-(3-ethoxypropyl)ethyldithiocarbamate. | Severe phytotoxicity to barnyard grass, crab grass, wild buckwheat and sorghum; moderate phytotoxicity to wild oats, rye grass, sugar beet, pigweed and tomato. |

When applied at 5 pounds per acre, 2-chloroallyl bis(2-methoxyethyl)dithiocarbamate and allyl bis(2-methoxyethyl)dithiocarbamate are severely toxic to wild oats, brome grass and foxtail and 2-chloroallyl N-(3-ethoxypropyl)ethyldithiocarbamate is severely toxic to barnyard grass, crab grass and pigweed. At 1 pound per acre 2-chloroallyl N - (3 - ethoxypropyl)ethyldithiocarbamate is still severely toxic to crab grass while allyl bis(2-methoxyethyl)dithiocarbamate is severely toxic to brome grass and foxtail.

Herbicidal activity on foliage contact is illustrated by the data recorded in Table II. A spray containing the concentration of the active ingredient shown in the table is applied to the foliage of grasses, to the foliage of bean plants and to the foliage of a mixture of broadleaved plants. The mixture is indicated in the table as "Broadleaf." A rating of 0 indicates no phytotoxicity, 1 slight, 2 moderate and 3 severe phytotoxicity.

Table II

| Active Ingredient | Percent Conc. | Pytotoxicity Rating | | |
| --- | --- | --- | --- | --- |
| | | Grass | Bean | Broadleaf |
| Allyl bis(2-methoxyethyl)dithiocarbamate | 0.5 | 1+ | 3+B* | 2+ |
| 2-Chloroallyl bis(2-methoxyethyl)-dithiocarbamate | 0.5 | 2+ | 3+ | 3 |
| | 0.2 | 2+ | 1+ | 2 |
| 2-Chloroallyl bis(3-methoxypropyl) dithiocarbamate | 0.5 | 2 | 1 | 2 |
| 2-Chloroallyl N-(3-ethoxypropyl) ethyldithiocarbamate | 0.5 | 2 | 1 | 2 |

NOTE.—B*—95% defoliation.

It is intended to cover all changes and modifications of the examples of the invention herein chosen for purposes of disclosure which do not constitute departures from the spirit and scope of the invention.

What is claimed is:
1. The method of controlling vegetation which comprises applying thereto a phytotoxic concentration of a phytotoxic ester of a dithiocarbamic acid of the general formula

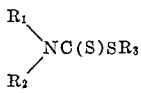

where $R_1$ represents a lower alkoxy substituted lower alkyl group, $R_2$ represents a member selected from the group consisting of lower alkyl, lower alkenyl and lower alkoxy substituted lower alkyl and $R_3$ represents a member selected from the group consisting of lower alkyl, lower alkenyl and mono-halogen substituted lower alkenyl.

2. The method of controlling vegetation which comprises applying thereto a phytotoxic concentration of a phytotoxic ester of a dithiocarbamic acid of the general formula

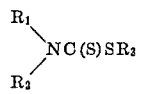

where $R_1$ and $R_2$ represent lower alkoxy substituted lower alkyl groups and $R_3$ represents a lower alkyl group.

3. The method of controlling vegetation which comprises applying thereto a phytotoxic concentration of a phytotoxic ester of a dithiocarbamic acid of the general formula

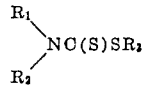

where $R_1$ and $R_2$ represents lower alkoxy substituted lower alkyl groups and $R_3$ represents a lower alkenyl group.

4. The method of controlling vegetation which comprises applying thereto a phytotoxic concentration of a phytotoxic ester of a dithiocarbamic acid of the general formula

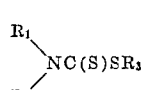

where $R_1$ and $R_2$ represent lower alkoxy substituted lower alkyl groups and $R_3$ represents a halogen substituted lower alkenyl group.

5. The method of controlling vegetation which comprises applying thereto a phytotoxic concentration of a phytotoxic ester of a dithiocarbamic acid of the general formula

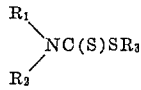

where $R_1$ represents a lower alkoxy substituted lower alkyl group and $R_2$ and $R_3$ represent lower alkyl groups.

6. The method of controlling vegetation which comprises applying thereto a phytotoxic concentration of a phytotoxic ester of a dithiocarbamic acid of the general formula

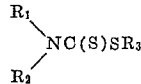

where $R_1$ represents a lower alkoxy substituted lower alkyl group, $R_2$ represents a lower alkyl group and $R_3$ represents a lower alkenyl group.

7. The method of controlling vegetation which comprises applying thereto a phytotoxic concentration of a phytotoxic ester of a dithiocarbamic acid of the general formula

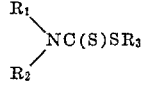

where $R_1$ represents a lower alkoxy substituted lower alkyl group, $R_2$ represents a lower alkyl group and $R_3$ represents a mono-halogen substituted lower alkenyl group.

8. The method of controlling vegetation which comprises applying thereto a phytotoxic concentration of allyl N,N-bis(2-methoxyethyl)dithiocarbamate.

9. The method of controlling vegetation which comprises applying thereto a phytotoxic concentration of allyl N-(3-ethoxypropyl)-N-ethyldithiocarbamate.

10. The method of controlling vegetation which comprises applying thereto a phytotoxic concentration of 2-chloroallyl N,N-bis-(3-methoxypropyl)dithiocarbamate.

11. The method of controlling vegetation which comprises applying thereto a phytotoxic concentration of 2-chloroallyl N,N-bis-(2-methoxyethyl)dithiocarbamate.

12. The method of controlling vegetation which comprises applying thereto a phytotoxic concentration of 2-chloroallyl N-(3-ethoxypropyl) N-ethyldithiocarbamate.

13. Herbicidal composition in the form of an emulsifiable concentrate comprising an organic solvent carrier, surface active agent and phytotoxic ester of a dithiocarbamic acid of the general formula

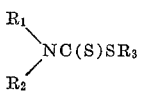

where $R_1$ represents a lower alkoxy substituted lower alkyl group, $R_2$ represents a member selected from the group consisting of lower alkyl, lower alkenyl and lower alkoxy substituted lower alkyl and $R_3$ represents a member selected from the group consisting of lower alkyl, lower alkenyl and mono-halogen substituted lower alkenyl.

14. Herbicidal composition in the form of an emulsifiable concentrate comprising an organic solvent carrier, a surface active agent and phytotoxic ester of a dithiocarbamic acid of the general formula

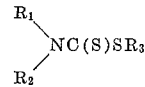

where $R_1$ and $R_2$ represent lower alkoxy substituted lower alkyl groups and $R_3$ represents a lower alkenyl group.

15. Herbicidal composition in the form of an emulsifiable concentrate comprising an organic solvent carrier, a surface active agent and phytotoxic ester of a dithiocarbamic acid of the general formula

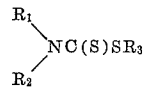

where $R_1$ and $R_2$ represent lower alkoxy substituted lower alkyl groups and $R_3$ represents a mono halogen substituted lower alkenyl group.

References Cited in the file of this patent

UNITED STATES PATENTS

| | | |
|---|---|---|
| 2,876,243 | Harman et al. | Mar. 3, 1959 |
| 2,882,291 | Harman et al. | Apr. 14, 1959 |
| 2,895,980 | Harman et al. | July 21, 1959 |